United States Patent
Grossbart et al.

(10) Patent No.: US 8,055,619 B2
(45) Date of Patent: Nov. 8, 2011

(54) MECHANISMS TO SUPPORT OBJECT-ORIENTED VERSION CONTROL OPERATIONS

(75) Inventors: Zack Grossbart, Cambridge, MA (US); Lee Edward Lowry, Orem, UT (US); Volker Gunnar Scheuber-Heinz, Pleasant Grove, UT (US); Rajesh Vasudevan, Sandy, UT (US); Brent Thurgood, Spanish Fork, UT (US); William Street, Orem, UT (US); Karin Stella Lundberg, Santa Clara, CA (US)

(73) Assignee: Novell, Inc., Provo, UT (US)

( * ) Notice: Subject to any disclaimer, the term of this patent is extended or adjusted under 35 U.S.C. 154(b) by 643 days.

(21) Appl. No.: 12/133,492

(22) Filed: Jun. 5, 2008

(65) Prior Publication Data

US 2009/0307278 A1    Dec. 10, 2009

(51) Int. Cl.
  *G06F 17/30* (2006.01)
(52) U.S. Cl. .................. 707/638; 707/695; 707/806
(58) Field of Classification Search .................. 707/638, 707/695, 806, 999.203, 999.107
See application file for complete search history.

(56) References Cited

U.S. PATENT DOCUMENTS

| | | | | |
|---|---|---|---|---|
| 5,805,889 | A | * | 9/1998 | Van De Vanter ............ 717/107 |
| 5,897,642 | A |   | 4/1999 | Capossela et al. |
| 5,900,870 | A | * | 5/1999 | Malone et al. ............... 715/866 |
| 6,081,798 | A | * | 6/2000 | Johnson et al. ............... 706/54 |
| 6,477,701 | B1 |  | 11/2002 | Heistermann et al. |
| 6,757,710 | B2 | * | 6/2004 | Reed ............................. 709/203 |
| 6,763,498 | B2 | * | 7/2004 | Egilsson ...................... 715/762 |
| 6,865,599 | B2 | * | 3/2005 | Zhang .......................... 709/218 |
| 7,209,933 | B2 |  | 4/2007 | Saxena |
| 7,322,025 | B2 |  | 1/2008 | Reddy et al. |
| 7,448,028 | B2 | * | 11/2008 | Koutyrine et al. ........... 717/148 |
| 7,493,592 | B2 | * | 2/2009 | Karatal et al. ................ 717/105 |
| 7,496,648 | B2 | * | 2/2009 | Manion et al. ................ 709/223 |
| 7,577,938 | B2 | * | 8/2009 | Bent et al. ..................... 717/113 |
| 7,653,893 | B2 | * | 1/2010 | Neumann et al. ............ 717/101 |
| 7,657,868 | B2 | * | 2/2010 | Shenfield et al. ............ 717/107 |
| 2004/0250239 | A1 |  | 12/2004 | Fox et al. |

* cited by examiner

*Primary Examiner* — Leslie Wong
(74) *Attorney, Agent, or Firm* — Schwegman, Lundberg & Woessner, P.A.

(57) ABSTRACT

Mechanisms to support object-oriented version control operations are provided. A user manipulates and views a project from an object viewpoint and within an object module. The user performs version control operations using object handles. The object handles are resolved to specific file references and the specific file references are used to process legacy version control commands utilizing a legacy version control system in a manner that is transparent to the user.

7 Claims, 3 Drawing Sheets

MECHANISMS TO SUPPORT OBJECT-ORIENTED VERSION CONTROL OPERATIONS

BACKGROUND

Collaborative environments are becoming pervasive in the industry. One area of collaboration that is critical to an enterprise is that which is associated with new software development. During software development a variety of different developers can be working on the same or dependent modules at the same time and in entirely different processing environments. A variety of different project life-cycle and version control systems attempt to coordinate project activities in scenarios such as this.

One management and support aspect, which is associated with software project development, is version control. That is, some modules may be in various stages of development, such as: bug fixes, enhancements, lacking certain features, production readiness. Moreover, sometimes an enhancement may have to be rolled back to a prior pre-enhancement version when problems are detected. Thus, a robust version control system is a must in project development environments.

Typically, version control systems are used to coordinate and manage collaboration on projects. The projects often include many sub components, such as coding modules. Under such circumstances, the coding modules are managed by the version control systems exclusively as individual files.

The problem with this approach is that often there is a great deal of inter-file dependency for any particular project. The management of inter-file dependencies is usually not even attempted by traditional version control systems; rather, the users themselves have to manually manage the dependencies when loading, merging, and updating components of the project. This means that the users have to be savvy and skilled in the use of the version control systems. Another compounding issue is that developers may be representing the project in an object model, such that the developers are forced to map and think about the object model in terms of files in order to properly interface and work with the version control systems. Managing complex dependencies at the individual file level can often be overwhelming and nearly impossible from a practical standpoint in a complex coding project; thus, version control may not be embraced because of the deficiencies of version control or may be used with a great deal of effort and time to adapt it to the needs of the project.

Thus, improved mechanisms are needed for improved version-control within a project-based environment.

SUMMARY

In various embodiments, mechanisms to support object-oriented version control operations are provided. More specifically, and in an embodiment, an object-oriented version control framework service is provided for transparently performing version control operations in a project environment. An attempt is detected by a user to process a version control operation against an object from within a project processing environment. A determination is made that a definition for the object spans one or more files and the version control operation is translated into multiple version control system operations associated with a version control system. Next, the version control system is interacted with for purposes of processing the multiple version control system operations against the multiple files and thereby satisfying the initial request made by the user.

DETAILED DESCRIPTION

Figure 1:
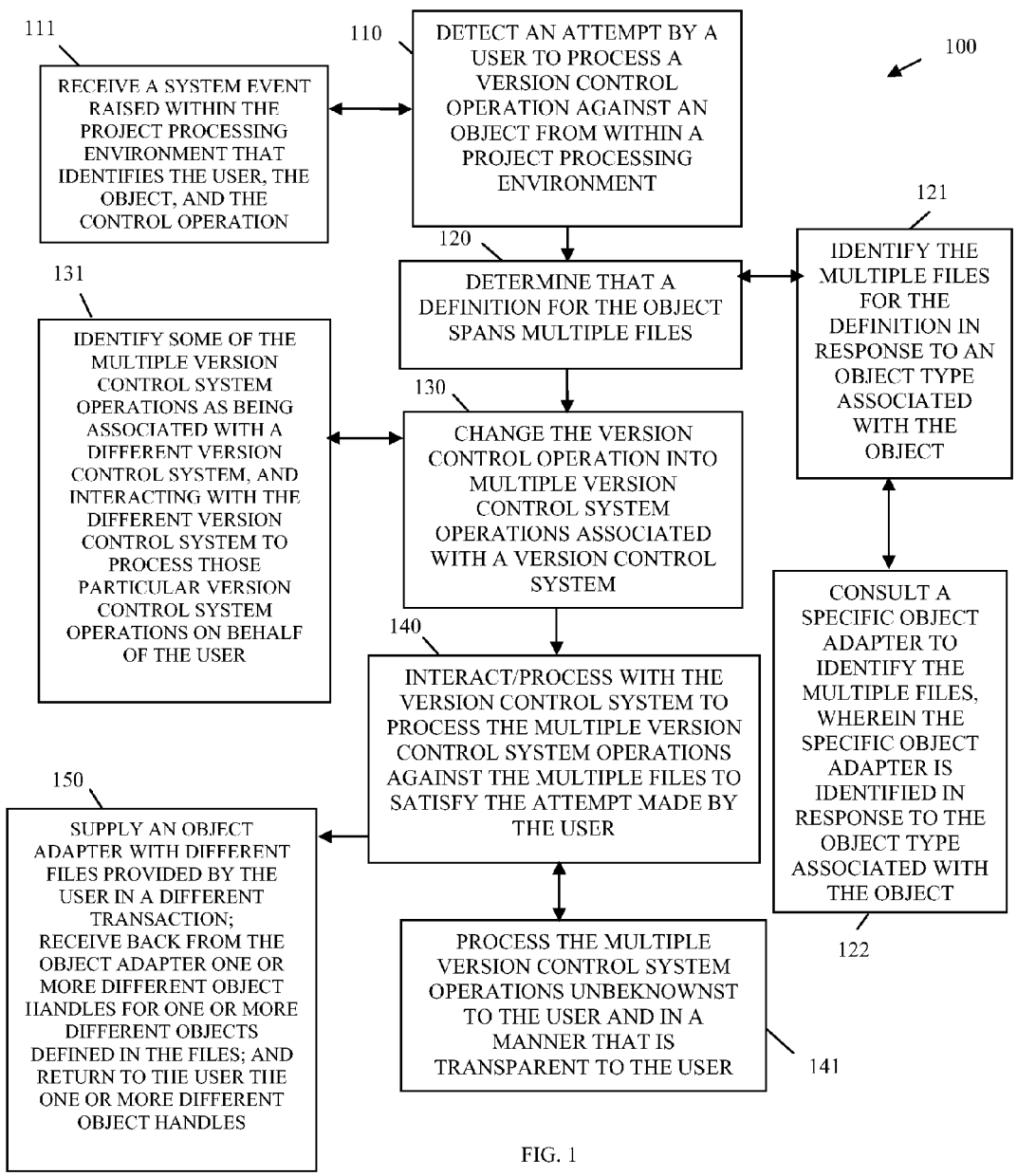
FIG. 1 is a diagram of a method for transparently performing version control operations in a project environment, according to an example embodiment.

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

A "software module" is a particular type of resource that processes as instructions on a machine, such as a computer. The phrase "software module" and the term "object" may be used interchangeably herein and below. Thus, an object is a set of instructions implemented on a computer-readable storage medium that processes on a computer.

Also, as used herein an "object" may also be used interchangeably with the usage of "resource." Another type of resource, such as a file, can be used to physically define the object. The definition and content of an object can span multiple different files. In this sense, the object is a logically defined resource that can span multiple other physical resources.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

A "project processing environment" is a processing environment in which any portion (resource) of a project processes within. So, some portions of a project may process within the project processing environment whereas other options of the project use different processing environments.

Objects are shared, versioned, and managed via various projects and various processing environments within an enterprise. As will be described more completely herein and below, each object can versioned with a legacy version control system even when the legacy version control system operates strictly on a file level and does not understand the abstraction associated with an object.

Various embodiments of this invention can be implemented in existing network architectures, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

FIG. 1 is a diagram of a method 100 for transparently performing version control operations in a project environment, according to an example embodiment. The method 100 (hereinafter "object version control service") is implemented as instructions in a machine-accessible and readable medium. The instructions when executed by a machine (processor and memory enabled device, such as a computer, etc.) perform the processing depicted in the FIG. 1. The object version control service is also operational over and processes within a network. The network may be wired, wireless, or a combination of wired and wireless.

As will be more fully described herein and below, the object version control service permits a user to perform versioning operations at an object level of abstraction even when the underlying physical files that define the objects are required by the legacy version control system that supplies the versioning capabilities.

At 110, the object version control service detects an attempt by a user to process a version control operation against an object and from within a project processing environment. This can occur in a variety of manners.

For instances, at 111, the object version control service receives a system event that identifies the user, the object, and the version control operation. The event is raised from within the project processing environment.

In other cases, a proxy can be used to intercept any attempt by the user to access a legacy version control system, such that the version control operation is detected, intercepted, and acquired by the object version control service.

The version control operation can be anything from a read or load operation to an update and/or write operation against the object. The version control operation can also support informational operations, such as history operations, compare operations, etc. The version control operation can also support operations for margining versions and reverting back to previous versions. Checking the object in and out and updating it from the legacy version control system is managed via the object version control service, which the user may be entirely unaware of. The user loads and updates objects at an object-oriented abstraction layer of detail and the physical abstraction layer that translates the objects to physical files is managed by the object version control service on behalf of the user.

At 120, the object version control service determines that a definition for the object spans multiple physical files. That is, the object that the user is referencing is defined across different physical files at its physical layer of abstraction. Typically, the user would have to understand this association between the object-oriented abstraction layer of the object name and the physical definition layer at the file abstraction layer in order for the user to use a legacy or enterprise version control system to manage the object. As detailed above, this can be so difficult to achieve that an enterprise may entirely forgo any version control solution or may impose a great deal of work and technical coordination on the project members to ensure that they are properly making the associations for using an existing enterprise version control solution. These problems are solved herein because the user can manage the object's versions via an existing enterprise version control system using the object-oriented abstraction layer (as discussed herein and below).

In an embodiment, at 121, the object version control service identifies the multiple files for the definition in response to an object type associated with or assigned to the object. The suffix of how an object is named or even an attribute or method of the object may identify what type of object the object version control service is addressing. Once the type is known this can be used to locate the multiple files in a variety of manners.

For instance, at 122, the object version control service can consult a specific object adapter that is of the same type as that which is associated with the object. So, each different object type has its own plugin adapter that the object version control service consults to resolve the physical files associated with the object definition.

Once the object version control service has the physical files associated with the object, at 130, the object version control service changes or translates the version control operation submitted by the user into multiple version control operations that are used and understood by a legacy enterprise version control system. For example, if the user requested a load of object A and the object version control service resolved A to be in files X and Y, then the object version control service issues load commands to the native versioning control system for files X and Y. The user is entirely unaware of the physical mapping between the object-oriented abstraction layer associated with the object name A and the physical-file layer of abstraction associated with the multiple files X and Y. So, the user and enterprise retains the benefit of a potentially robust legacy version control system while the users continue to think of and manage the project via a higher-level of abstraction associated with objects and object names.

According to an embodiment, at 131, the object version control service can also be used to integrate multiple different underlying version control systems. So, the version control operation may identify some files or translate to some operations associated with different and disparate version control systems. In such a case, the object version control service can process different version control operations against each of the version control systems. In this manner, the actual version management can span multiple disparate version control systems.

At 140, the object version control service interacts with the version control system to process the multiple version control operations against the multiple files to satisfy the original attempt by the user to process the version control operation. At this point, the user has now processed a version control operation (load, check out, update, check in, delete, create, write, etc.) using an object reference when the underlying version control system is not aware of that higher-level of abstraction and just deals with the file-layer of abstraction. This is achieved via the intermediary processing of the object version control service as detailed above.

In some cases, at 141, the object version control service can achieve the processing of the version control operations against the version control system in a manner that is entirely transparent and unknown to the user. So, the user does not need to be aware of any details that are associated with the version control system and its interfaces.

In fact, the object version control service can present a new interface to the user that maps to the version control system or can present an existing version control system interface to the user that is modified to accept object references and operations. In either situation, the object version control service intercepts and acts as an intermediary to translate the object references into physical file references that the version control system understands and natively works with.

According to an embodiment, at 150, the object version control service can subsequently supply an object adapter (discussed above with reference to the embodiment at 122 and discussed below with reference to the FIG. 2) with different file references supplied by a user (such as an administrator) in an entirely different transaction between the user and the object version control service. The object version control service receives back from the object adapter one or more different object handles for one or more different objects that the files define. The object version control service then supplies the object handles to the user. So, the reverse can happen as well, which is files can be used to identify object definitions. This may be particularly useful to administrators trying to better organize the physical environment of a project to achieve better processing efficiency.

Figure 2:
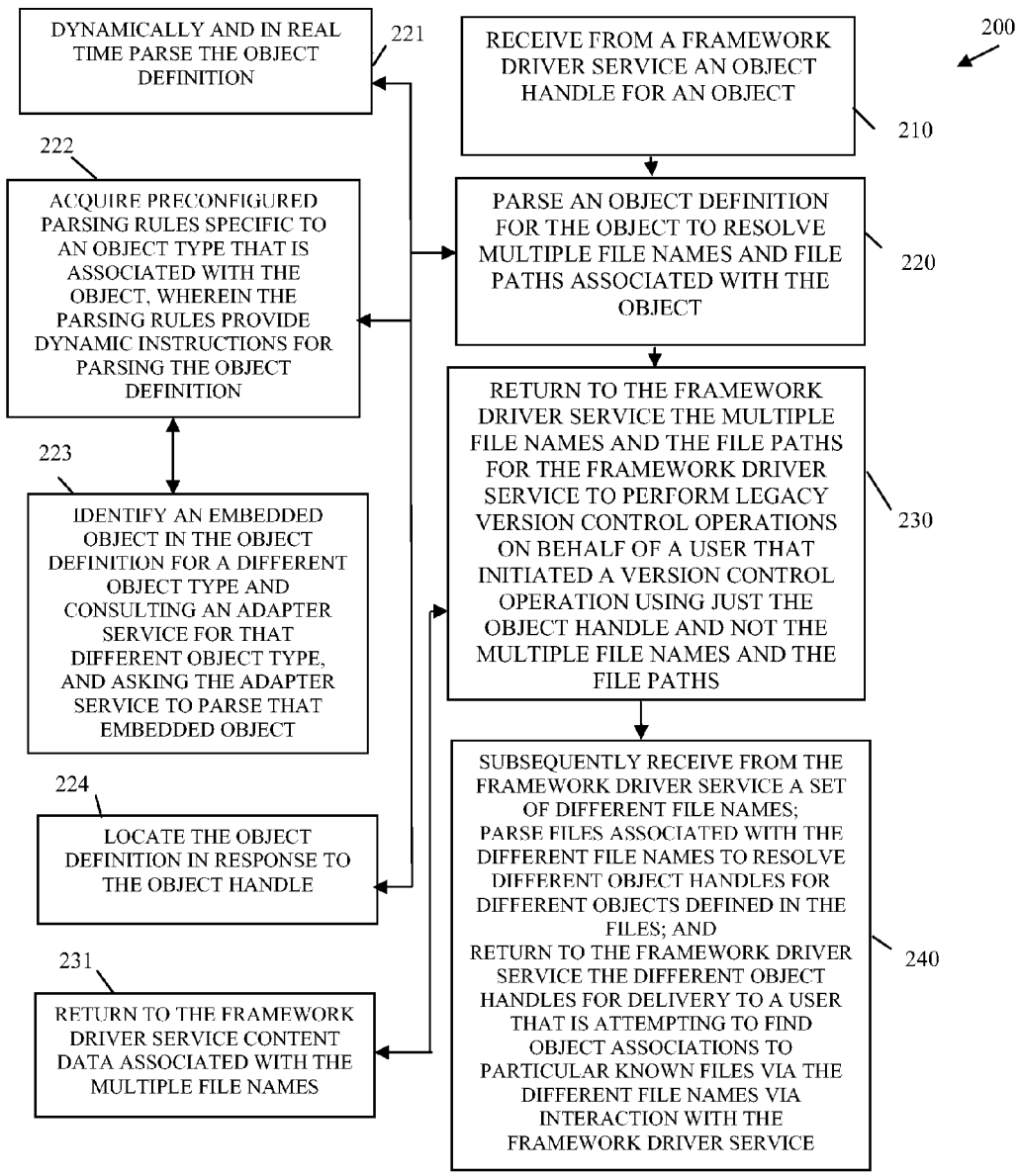
FIG. 2 is a diagram of a method for resolving file references associated with an object that is the subject of a version control operation, according to an example embodiment.

FIG. 2 is a diagram of a method 200 for resolving file references associated with an object that is the subject of a version control operation, according to an example embodiment. The method 200 (hereinafter "object adapter service") is implemented as instructions in a machine-accessible and readable medium. The instructions when executed by a machine perform the processing depicted in the FIG. 2. The object adapter service is also operational over and processes within a network. The network may be wired, wireless, or a combination of wired and wireless.

The object adapter service represents a mechanism that can be used by the object version control service (discussed above with respect to the method 100 of the FIG. 1) to provide dynamic resolution between an object and its underlying physical files and vice versa. The object version control service can then use this mapping to perform legacy version control commands on a legacy version control system in a manner that is transparent to the user.

At 210, the object adapter service receives from an object framework service (such as the object version control service of the method 100 discussed above with reference to the FIG. 1) an object handle for an object.

In some cases, the object adapter service is preconfigured and implemented to handle specific object types and the object framework service just consults the object adapter service for objects of the type that the object adapter service is designed to handle. Thus, the project processing environment can include a plurality of differently configured instances of the object adapter service, each instance handling a specific type of object.

At 220, the object adapter service parses an object definition for an object to resolve multiple file names and file paths associated with the object being referenced via the object handle.

According to an embodiment, at 221, the object adapter service dynamically and in real time parses the object definition on each specific request. So, there is no need to maintain mappings since the parsing is a dynamic and real time process that occurs each time the object adapter service is consulted.

In still another situation, at 222, the object adapter service acquires preconfigured parsing rules that are specific to an object type, which is associated with the object. The parsing rules provide dynamic instructions for parsing the object definition. Thus, if modifications are made to an object type and its definition just the rules are updated and the object adapter service dynamically interprets and processes the rules, so no recompiling or re-linking of the object adapter service is ever needed.

Sometimes, at 223 and continuing with the embodiment of 222, the object adapter service identifies an embedded object in the object definition (nested objects). The embedded object is associated with an entirely different object type from that which the object adapter service is designed to handle. In such a situation, the object adapter service consults a different instance of the object adapter service, which is designed to handle the embedded object's type, and asks that that different instance of the object adapter service parse the embedded object for its underlying physical file structure.

In some cases, at 224, the object adapter service locates the definition for the object in response to the object handle. In other words, the object handle is a form of an object identity and the object identity provides a mechanism for the object adapter service to acquire the definition for that particular object instance. This can be done via naming conventions or via consultation with third-party services, such as identity services.

At 230, the object adapter service returns back to the framework driver service the multiple file names and file paths associated with those names. The framework driver service then uses the file names and paths (underlying physical structure for the object) to perform legacy version control operations on behalf of a user that initiated a version control operation using just the object handle and not the multiple file names and file paths (physical structure for the object). The details of this processing were provided above with reference to the method 100 of the FIG. 1.

According to an embodiment, at 231, the object adapter service also returns to the framework driver service content data housed in the file names at the file paths. So, depending upon the original version control operation requested by the user of the framework driver service, the object adapter service returns not only file structure and references but also returns the contents of those files.

In some cases, the object adapter service can also provide reverse processing operations from that which was described above. In other words, the processing discussed above at 210-230 describes a mechanism for dynamically mapping from a higher level of object-oriented abstraction to a physical-file layer of abstraction; the object adapter service can also do the reverse and use the file structure provided to provide the higher level object-oriented abstraction.

Thus, at 240, the object adapter service subsequently receives from the framework driver service a different set of file names. The object adapter service then parses these files to resolve or identify different object handles associated with different objects. The different object handles are then supplied back to the framework driver service for deliver to the user. The user is attempting to find object associations to known files via the supplied different file names and via interactions with the framework driver service.

Since the object adapter service is designed to handle specific object types or classes of object types, the processing described at 240 can be handled via a generic instance of the object adapter service that can identify each of the available object types that then selects a specific instance of another object adapter service to handle a specific resolved object type. In this manner, moving from lower level abstraction to higher level abstraction can be handled by the framework driver service consulting a generic version of the object adapter service adapted to perform this reverse processing.

Figure 3:
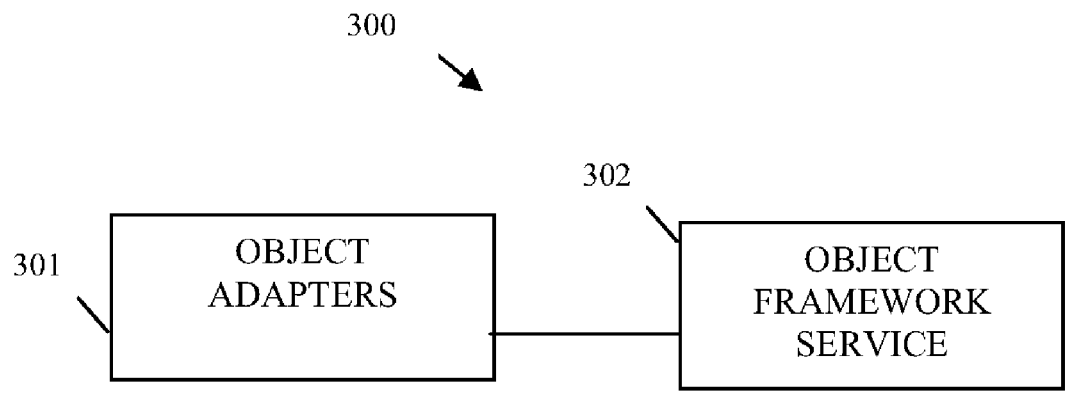
FIG. 3 is a diagram of an object-oriented version control system, according to an example embodiment.

FIG. 3 is a diagram of an object-oriented version control system 300, according to an example embodiment. The object-oriented version control system 300 is implemented as instructions on or within a computer-readable storage medium and a machine-accessible and readable medium. The instructions when executed by a machine (computer, etc.) perform various aspects of the processing depicted with respect to the method 100 of the FIG. 1 and the method 200 of the FIG. 2. The object-oriented version control system 300 is also operational over a network and the network may be wired, wireless, or a combination of wired and wireless.

The object-oriented version control system 300 includes object adapters 301 and an object framework service 302. Each of these components and their interactions with one another will now be discussed in turn.

Each object adapter 301 is implemented in a machine-accessible and a computer-readable storage readable medium and is to process on a machine within of the network. Example processing associated with a generic object adapter 301 was presented above with reference to the method 200 of the FIG. 2.

Each object adapter 301 is preconfigured to dynamically parse a particular object type and its definition for purposes of locating specific file names and file paths, which are then returned upon request to the object framework service 302. So, the object adapter 301 does not have to maintain static mappings; rather, dynamic processing can occur via rules, policies, etc. to resolve the specific file names and paths (physical structure) of the requested object each time an object is needed for a version control operation.

According to an embodiment, each object adapter 301 is also preconfigured to return content data associated with or housed at the file names to the object framework service 302 upon the request.

In some cases, a generic object adapter 301 can be consulted by the object framework service 302 and supplied file references in response thereto the generic object adapter 301 resolves object handles defined in the supplied file references.

The object framework service 302 is implemented in a machine-accessible and computer-readable storage medium and is to process on one of the machines of the network. Example processing associated with the object framework service 302 was presented in detail above with reference to the method 100 of the FIG. 1.

The object framework service 302 interacts with users to permit the users to perform version control operations against objects using object handles. The object framework service 302 selects object adapters 301 that when supplied the object handles return back file names and file paths. The object framework service 302 translates the version control operations into legacy version control system commands using the file names and the file paths and processes the legacy version control commands against one or more legacy version control systems to satisfy the version control operations initiated by the users.

According to an embodiment, the object framework service 302 selects a particular object adapter 301 for a particular version control operation in response to a particular object type that is associated with a particular object handle supplied by a particular user. In other words, the object framework service 302 is able to determine how to resolve the file structure for an object based on the object type, which alerts the object framework service 302 to a particular object adapter 301 that can resolve the file structure on behalf of the object framework service 302.

In still another situation, the object framework service 302 processes as a front-end interface to the one or more legacy version control systems. So, the user accesses the object framework service 302 to perform versioning operations. This can occur in a manner that is entirely transparent and unknown to the users or can occur in a manner that the user if fully aware of, such as when the object framework service 302 includes its own unique interface that is presented to the users for interaction.

Figure 4:
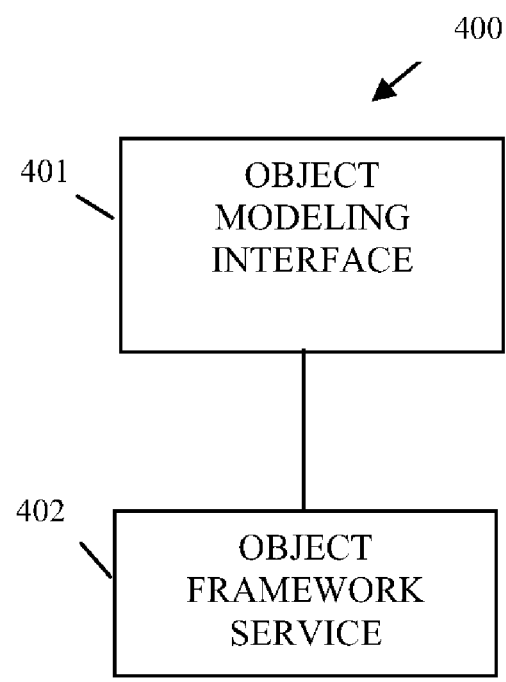
FIG. 4 is a diagram of another object-oriented version control system, according to an example embodiment.

FIG. 4 is a diagram of another object-oriented version control system 400, according to an example embodiment. The object-oriented version control system 400 is implemented as instructions on or within a machine-accessible and computer-readable storage medium. The instructions when executed by a machine (such as a computer) perform various aspects of the processing depicted with respect to the methods 100 and 200 of the FIGS. 1 and 2, respectively, and processing associated with the system 300 of the FIG. 3. The object-oriented version control system 400 is also operational over a network and the network may be wired, wireless, or a combination of wired and wireless.

The object-oriented version control system 400 includes an object modeling interface 401 and an object driver service 402. Each of these components and their interactions with one another will now be discussed in turn.

The object modeling interface 401 is implemented in a machine-accessible and computer-readable storage medium and is to process on a machine within the network.

The object modeling interface 401 is a graphical user interface (GUI) that a user interacts with to visually discern objects and object relationships for a project. The object modeling interface permits the user to load and perform version control operations on the objects. In some cases, the object modeling interface 401 permits a user to graphically draw objects and object relationships while maintaining the underlying file structure in a manner that is transparent to the user. So, the user works with just the object-oriented view of the objects and the object modeling interface 401 manages the physical layer of abstraction for version control operations.

The object driver service 402 is implemented in a machine-accessible and computer-readable storage medium and is to process on the same machine as the object modeling interface 401 or an entirely different machine of the network. Example processing associated with the object driver service was described in various aspects above with reference to the method of the FIG. 1 and with respect to the system 300 of the FIG. 3.

The object driver service 402 interacts with the object modeling interface 401 to translate load and version control operations into specific file references that are processed as legacy version control commands against a legacy version control system.

According to an embodiment, the object driver service 402 permits the user via the object module interface 401 to supply specific file names and in response thereto resolves specific object handles for specific objects that are defined in those specific file names. So, the object driver service 402 can provide a dynamic and real time mapping moving from an object-oriented view of abstraction to the file-layer of abstraction and vice versa.

In another case, the object driver service 402 interacts with a plurality of object adapters to resolve the file references, each object adapter associated with a unique object type. This was discussed in detail above with reference to the method 200 of the FIG. 2 and with reference to the object adapters 301 of the FIG. 3.

Still further and in specific embodiment, the object driver service 402 communicates the specific file references to the object module interface 401 when the user performs a right mouse click or selects a particular option within the GUI for a particular object being displayed within the GUI. The object module interface 401 generates a popup window within the GUI that displays the specific file references back to the user in response to the right mouse client or selection of the particular option. So, users can dynamically visualize the mappings between their objects and the physical file layer.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented implemented in a non-transitory computer-readable medium and for execution on a machine, the method, comprising:
   receiving, at the machine, from a framework driver service an object handle for an object;
   parsing, by the machine, an object definition for the object to resolve multiple file names and file paths associated with the object, a definition for the object spans multiple physical files identified by the multiple file names and the file paths; and
   returning, by the machine, to the framework driver service the multiple file names and the file paths for the framework driver service and performing legacy version control operations on behalf of a user that initiated a version control operation using just the object handle and not the multiple file names and the file paths, the user provides the object handle and the version control operation and transparent to the user the multiple file names and the file paths are used with the legacy version control operations for processing the version control operation against the multiple physical files for the definition of the object.

2. The method of claim 1 further comprising,
   subsequently receiving, at the machine and from the framework driver service a set of different file names;
   parsing, by the machine, files associated with the different file names to resolve different object handles for different objects defined in the files; and
   returning, by the machine, to the framework driver service the different object handles for delivery to a user that is attempting to find object associations to particular known files via the different file names via interaction with the framework driver service.

3. The method of claim 1, wherein parsing further includes dynamically and in real time parsing the object definition.

4. The method of claim 1, wherein parsing further includes acquiring preconfigured parsing rules specific to an object type that is associated with the object, wherein the parsing rules provide dynamic instructions for parsing the object definition.

5. The method of claim 4, wherein parsing further includes identifying an embedded object in the object definition for a different object type and consulting an adapter service for that different object type, and asking the adapter service to parse that embedded object.

6. The method of claim 1, wherein parsing further includes locating the object definition in response to the object handle.

7. The method of claim 1, wherein returning further includes returning to the framework driver service content data associated with the multiple file names.

* * * * *